June 11, 1968  M. HACSKAYLO ET AL  3,387,999
CAPACITOR HAVING DYSPROSIUM OXIDE DIELECTRIC
Filed June 23, 1965  2 Sheets-Sheet 1
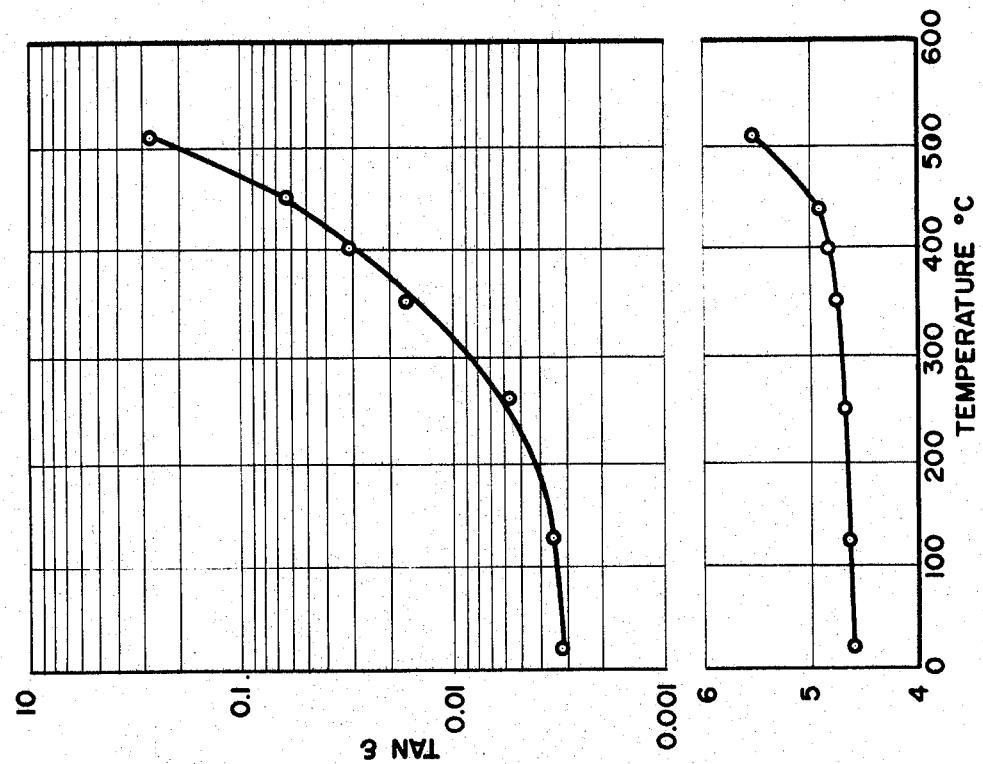
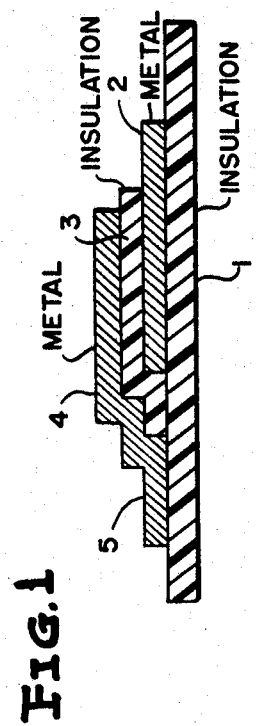
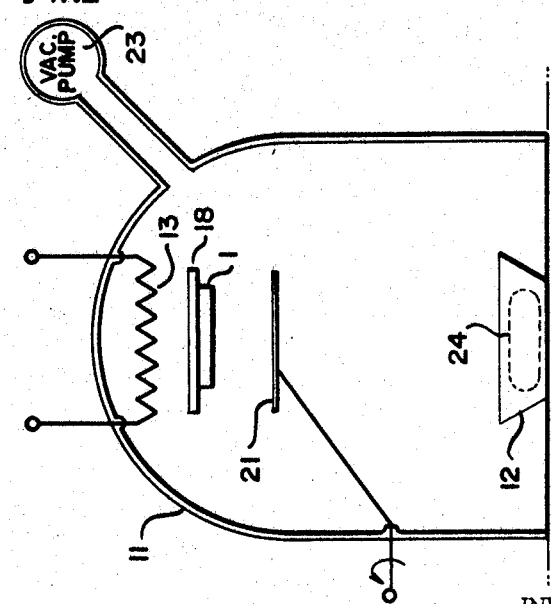
INVENTOR
MICHAEL HACSKAYLO
& RICHARD C. SMITH
BY *Hurwitz & Rose*
ATTORNEYS

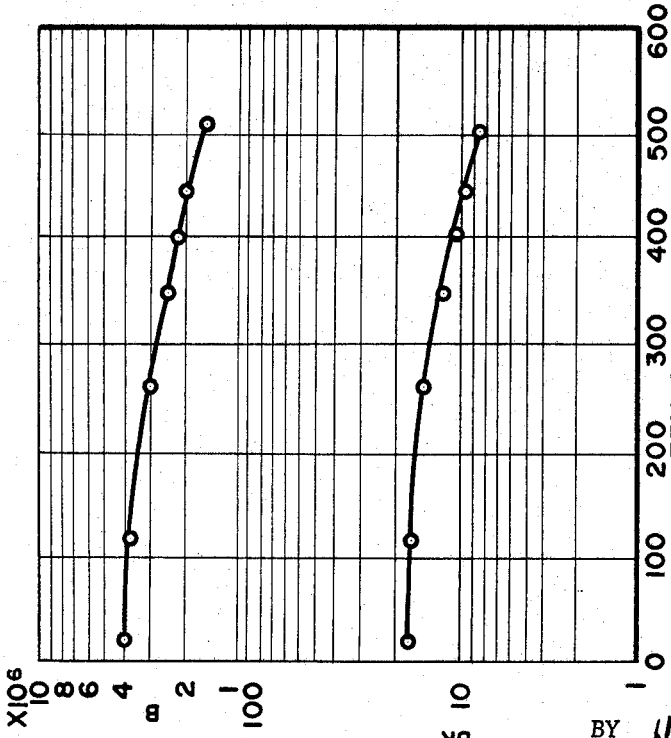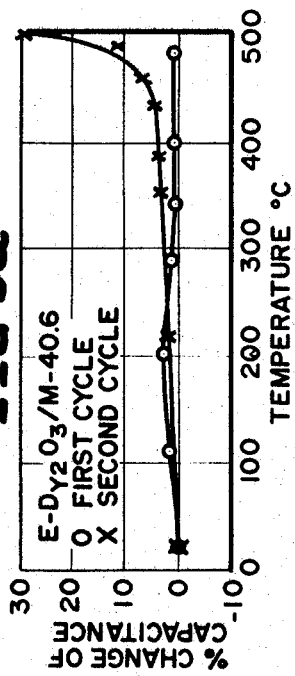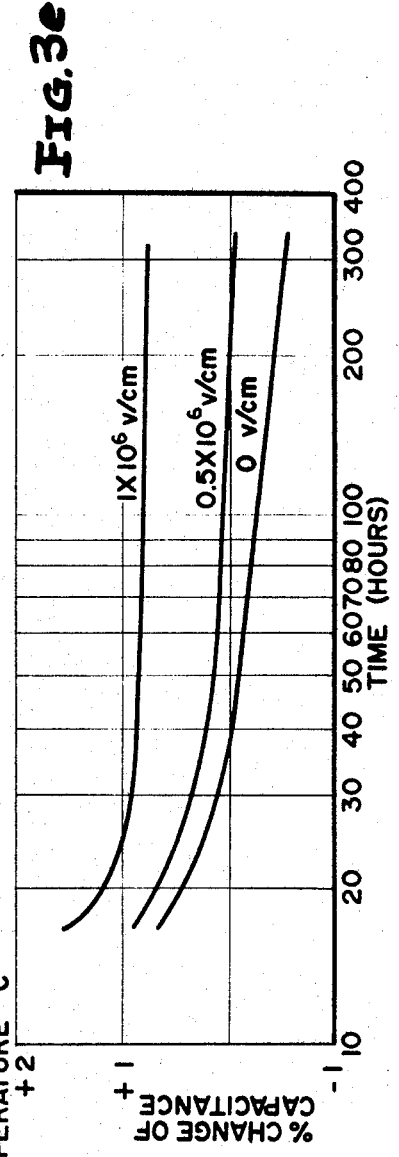

United States Patent Office 3,387,999
Patented June 11, 1968

3,387,999
CAPACITOR HAVING DYSPROSIUM
OXIDE DIELECTRIC
Michael Hacskaylo and Richard Charles Smith, Falls Church, Va., assignors to Melpar, Inc., Falls Church, Va., a corporation of Delaware
Filed June 23, 1965, Ser. No. 466,249
16 Claims. (Cl. 117—201)

ABSTRACT OF THE DISCLOSURE

A thin film capacitor, electrically and mechanically stable at high temperatures, is produced by depositing successive layers of metal, dielectric, and metal on an insulative substrate. The dielectric is deposited in the form of a thin film by evaporation of a mixture of oxides of dysprosium, boron, and silicon in a weight ratio of 80:10:10 ($\pm 2\%$), respectively, at temperatures ranging upwardly of 1650° C.

---

This invention relates generally to capacitors and more particularly to a capacitor having a dysprosium borosilicate dielectric, to a method for making same, and to a mixture employed as a starting material for the capacitor dielectric.

Many current standards require mechanical and electrical stability of thin film circuit elements to temperatures of approximately 500° C. Providing thin film capacitors to meet these requirements has proven to be quite difficult. Although some satisfactory dielectric films have been fabricated, considerable problems in fabrication and obtaining the same results with different runs have been encountered.

According to the present invention, there is provided a dysprosium borosilicate thin film dielectric that is electrically and mechanically stable to 500° C. The dielectric film is formed from a mixture, by weight, of 80$\pm$2% dysprosium dioxide ($Dy_2O_3$), 10$\pm$2% boric oxide ($B_2O_3$) and 10$\pm$2% silicon dioxide ($SiO_2$). This mixture is advantageously employed because it does not react with metals, hence can be placed directly in a metal evaporating boat within a vacuum vapor deposition chamber without using the intermediary of an inert liner.

In forming the dielectric film of the present invention, evaporant is allowed to propagate from the boat to a substrate upon which the deposit is being formed only when the mixture is in the temperature range from approximately 1700 to 1900° C. It was found that if this temperature range is not employed that the films have poor electrical properties. Likewise, there must be adherence to the specified mixture percentages to obtain films that are electrically stable and anhygroscopic.

A further feature of the dysprosium borosilicate films formed according to the present invention is that they are inert to moisture in the atmosphere. Hence, the probability of these films changing characteristics materially as a function of atmospheric exposure is minimized, in contrast with some prior art thin film dielectrics capable of withstanding high temperatures.

It is, accordingly, an object of the present invention to provide a new and improved thin film capacitor and method for making same.

Another object of the invention is to provide a new and improved dielectric that is capable of withstanding high temperatures without undergoing change in its electrical and mechanical characteristics, and to a method of fabricating such a dielectric.

An additional object of the present invention is to provide a new and improved stable high temperature dielectric film that is inert to atmospheric moisture, and to a method of making same.

A further object of the invention is to provide a new and improved mixture for forming dielectrics.

Still another object of the present invention is to provide a rare earth borosilicate dielectric that is formed by vaporization of a mixture from a metal boat without the need for an inert liner.

An additional object of the invention is to provide a mixture of a rare earth metal with compounds of boron and silicon, which mixture can be evaporated from a metal boat without the need for an inert liner.

A further object of the invention is to provide a dysprosium borosilicate dielectric for a capacitor.

The above and still further objects, features and advantages of the present invention will become apparent upon consideration of the following detailed description of one specific embodiment thereof, especially when taken in conjunction with the accompanying drawings, wherein:

FIGURE 1 is a side sectional view of a thin film capacitor according to a preferred embodiment of the present invention;

FIGURE 2 is a schematic diagram of the apparatus utilized in fabricating a film of the present invention; and FIGURES 3A–3E are graphs illustrating the electrical characteristics of capacitors according to the present invention.

Reference is now made to the cross-sectional view of FIGURE 1 wherein there is illustrated an insulating substrate 1, comprised preferably of glass or fused silica. Deposited on substrate 1 is a thin film metal 2, having a thickness on the order of 2000 angstroms, that preferably consists of aluminum or gold, but which can be copper, silver or platinum. Covering electrode 2 is stoichiometric dielectric film 3 of dysprosium borosilicate, that is preferably between 500 angstroms and 2.5 microns thick, although maximum thicknesses of 25 microns can be tolerated for very small valued capacitors. Covering dielectric film 3 is a second metal electrode 4, that is electrically insulated from electrode 2. Electrode 4 is formed from the same material and has approximately the same thickness as electrode 2.

Reference is now made to FIGURE 2 wherein the preferred apparatus for forming a capacitor of FIGURE 1 is illustrated. The apparatus comprises bell jar 11 which has located interiorly thereof, towards its base, electrically powered tungsten or tantalum heating boat 12. Positioned upstream of boat 12, in proximity to infrared heater 13, is horizontally extending support plate 18, to which is attached insulated substrate 1. Thin film circuits are formed on substrate 1 by vacuum vapor deposition in response to evaporation of various materials from the base of chamber 11, that is evacuated to a pressure of about $1 \times 10^{-5}$ mm. of Hg by vacuum pump 23 prior to the initiation of deposition.

To enable vapors to be selectively deposited from boat 13 onto substrate 1, shutter 21 is provided interiorly of chamber 11 within the vacuum stream between the boat and substrate. With shutter 21 maintained in the horizontal position illustrated, the flow of evaporant between boat 12 and substrate 1 is effectively blocked. Turning of a shaft, coupled by a vacuum feedthrough from the outside of chamber 11 to shutter 21, rotates the shutter out of the evaporant stream, whereby substrate 1 can be coated with a film of the material vaporized out of boat 12.

To form a capacitor, according to the present invention, substrate 1 initially has deposited thereon metal electrode 2 by conventional vacuum vapor deposition techniques. After electrode 2 has been deposited, while maintaining the interior of chamber 11 to a vacuum of approximately $2 \times 10^{-5}$ mm. of Hg and shutter 21 closed, a pellet 24 of the starting material for dielectric 3 is heated by applying current to boat 12. Because of the composition of pellet 24, it is located directly on the metallic surface of boat 12, without the intermediary of an inert liner so that maximum efficiency in transferring heat from the boat is obtained.

Pellet 24 consists of a mixture, by weight, of

80±2% $Dy_2O_3$, 10±2% $B_2O_3$ and 10±2% $SiO_2$ which mixture is ground finely with a deamonite mortar and pestle so that it is completely homogeneous. To provide capacitors with the required stability of electrical and mechanical characteristics to 500° C., it has been found necessary to maintain the percentages of the materials in pellet 24 to within the specified ranges. An increase in the weight ratio of boric oxide results in dielectric films that are hygroscopic and a lower amount of this material causes the formation of low resistance, lossy films. A pellet, rather than a powder, is the preferred form for the mixture because of its greater density and the lower likelihood of "fluffing out" from boat 12 prior to fusion.

With shutter 21 closed, the temperature of the mixture within boat 12 is raised at a moderate rate to 1650° C., while maintaining the chamber vacuum at approximately $2 \times 10^{-5}$ mm. of Hg. When the mixture temperature reaches 1650° C., it is in a fused, liquid state. The mixture temperature is then quickly raised to 1700° C. and stabilized at this level until the vacuum within chamber 11 returns to $2 \times 10^{-5}$ mm. of Hg. At this time, which is usually about 5 minutes after the 50° temperature increase, shutter 21 is opened. Each of the materials in pellet 24 is now vaporized to form the dysprosium borosilicate dielectric film 3 on electrode 2.

To provide the most rapid deposition rate for dielectric film 3, the mixture within boat 12 is maintained at a temperature of approximately 1900° C. If the mixture temperature is raised in excess of 1900° C., it has been found, through experimentation, that a dark film, that is not stoichiometric, is deposited, which film cannot be considered as a dielectric. Also, if shutter 21 is opened when the mixture temperature is less than 1700° C., non-homogeneous films that do not have adequate electrical properties are formed. It is believed that films formed under the latter conditions contain excessive amounts of $B_2O_3$ and insufficient quantities of $Dy_2O_3$ to form dielectrics having the preferred characteristics as those films fabricated when the mixture is evaporated in the temperature range between 1700 and 1900° C.

To insure adherence of dielectric film 3 to electrode 2, substrate 1 is preferably maintained at a temperature between 150 and 200° C. during the deposition operation. The elevated temperature of substrate 1 is obtained in response to infrared radiation from electric heater 13.

Because of the difficulties involved in analyzing thin dielectric films, we are not certain of the exact composition of layer 3. It is known, however, that the reactions of the materials in pellet 24 in the temperature range between 1700 and 1900° C. are:

$$Dy_2O_3(s) \rightarrow 2DyO(g) + O(g)$$
$$2SiO_2(l) \rightleftharpoons 2SiO(g) + O_2(g)$$
$$B_2O_3(l) \rightarrow B_2O_3(g);$$

where $(s)$, $(g)$ and $(l)$ indicate the solid, gaseous and liquid phases, respectively. Hence, we believe the suboxides of dysprosium and silicon, DyO and SiO, are deposited on the substrate in a finite partial pressure of oxygen. The DyO suboxide and $O_2$ are postulated to combine on the substrate as $Dy_2O_3$. Since gaseous $B_2O_3$ is known to condense as stoichiometric $B_2O_3$, dielectric film 3 is felt to comprise $Dy_2O_3$, $SiO_2$ and $B_2O_3$. In attempts to determine the composition of film 3, various tests have been conducted. Electron and X-ray diffraction studies of the films showed them to be amorphous while spectrographic film analysis indicated the major constituents to be silicon (about 50%) and boron (about 50%) with trace amounts (0.005 to 0.5%) of dysprosium. The index of refraction of the films to sodium light was found to be 1.547±0.0003, a value higher than the known 1.52430 index of refraction for borosilicate crown glass. In view of these findings, it has been concluded that the film is a dysprosium borosilicate glass.

After film 3 has been formed by the stated method, top metal electrode 4 is deposited by conventional vacuum vapor deposition techniques thereon.

The outstanding characteristics of capacitors formed according to the present invention are given by Table I and FIGURES 3A–3E.

TABLE I.—ELECTRICAL CHARACTERISTICS OF A DYSPROSIUM BOROSILICATE CAPACITOR LISTED AS A FUNCTION OF TEMPERATURE

| Operating Temperature (° C.) | Capacitance (pf.) | Dissipation Factor | Breakdown Voltage (volt) | Field Strength ($10^6$ v./cm.) |
|---|---|---|---|---|
| 23 | 464 | 0.0024 | 460 | 4.0 |
| 100 | 466 | 0.0025 | 445 | 3.9 |
| 200 | 470 | 0.0032 | 380 | 3.3 |
| 300 | 475 | 0.009 | 320 | 2.8 |
| 400 | 508 | 0.012 | 240 | 2.1 |
| 500 | 600 | 0.25 | 195 | 1.7 |

From this data, it is seen that the electrical characteristics of capacitors formed according to the present invention do not vary excessively over the temperature range 0–500° C., particularly in comparison with prior art capacitors that break down completely at the high temperatures stated. FIGURE 3A shows the temperature dependence of the relative dielectric constant and the dissipation factor from 25° to 500° C. FIGURE 3B gives the temperature dependence of dielectric field strength and the merit factor. The merit factor is the product of the dielectric field strength and the relative dielectric constant. It is thereby independent of film thickness and represents the quantity of charge stored by the capacitor per unit area. FIGURE 3C is a graph of the percentage change in capacitance (P.C.C.) with temperature for dielectric film 3 according to the present invention.

FIGURE 3D is an illustration of the percent change in capacitance for two heating cycles of a typical capacitor. The first cycle is in effect an annealing process wherein temperature is raised slowly to 470° C. and then drops slowly. The new room temperature value after the first temperature cycle has been completed is approximately 10 percent lower than the value at the beginning of the previous cycle. Using the new room temperature value, the percent change in capacitance is replotted in reference to this value. The deviation at 500° C. is 20% over the new room temperature capacitance. Subsequent cycles are found to follow the second curve very closely.

In FIGURE 3E the characteristics of three capacitors at a thermal stress of 300° C., with each at a different voltage stress are illustrated. The capacitors all have dielectric thicknesses exceeding 1 micron, and had applied to them electric fields of $1 \times 10^6$, $5 \times 10^5$ and 0 volts per centimeter thickness. After 17 hours under stress, the initial changes in capacitance were within two percent of room temperature value. After 300 hours under stress, the capacitance was decreasing less rapidly with the sample under 0 volts stress than room temperature capacitance by ½ of 1%. The sample stress at ½ million volts per centimeter was at room temperature capacitance and the sample stress at 1 million volts per centimeter exceeded room temperature value by approximately 1%. After 400 hours of stress, the capacitor stressed to $10^6$ volts per centimeter short circuited. Since the stated temperature and voltage stresses are rarely, if ever, encountered for the prolonged time periods specified, this data indicates the high degree of reliability obtained with dielectric films formed according to the present invention.

While we have described and illustrated one specific embodiment of our invention, it will be clear that variations of the details of construction which are specifically illustrated and described may be resorted to without departing from the true spirit and scope of the invention as defined in the appended claims.

We claim:
1. A capacitor produced by the process of depositing, on a metal layer, a stoichiometric thin dielectric film formed by vacuum evaporation of a mixture consisting essentially of $Dy_2O_3$, $B_2O_3$, and $SiO_2$ in the relative proportions by weight of 80:10:10, ±2%, respectively, and thereafter depositing a second metal layer on the exposed surface of the dielectric film.

2. The invention according to claim 1 wherein the dielectric film is deposited to a thickness in the range from 500 A. to 25 microns.

3. The invention according to claim 2 wherein each of the metal layers has a thickness of approximately 2000 A.

4. The invention according to claim 1 wherein the deposition of the dielectric film is carried out by vacuum evaporation of said mixture with the mixture maintained at temperatures in the range up to 1900° C.

5. The invention according to claim 4 wherein the temperature of the mixture is maintained in the range from 1700° C. to 1900° C.

6. The invention according to claim 5 wherein the vacuum is maintained at approximately $10^{-5}$ mm. of Hg.

7. The invention according to claim 4 wherein the mixture is compressed in the form of a pellet and is evaporated from a boat composed of a metal from the group consisting of tantalum and tungsten.

8. The invention according to claim 7 wherein the pellet is maintained in direct contact with the metallic surface of said boat.

9. The thin-film high-temperature capacitor fabricated by the process of deposition on an insulative substrate of successive layers of metal, dielectric film, and metal, the metal layers separated from one another by said film, wherein the dielectric film is formed by vacuum evaporating a mixture consisting essentially of 80±2%, $Dy_2O_3$, 10±2% $B_2O_3$, and 10±2% $SiO_2$, by weight, while maintaining the mixture in the temperature range from 1700° C. to 1900° C.

10. The invention according to claim 9 wherein the mixture is evaporated at said temperature range for a time sufficient to produce a dielectric film having a thickness in the range from 500 A. to 25 microns.

11. The invention according to claim 10 wherein said substrate is maintained at a temperature of from 150° C. to 200° C. during the depoisition of said film.

12. The capacitor in which the dielectric interposed between the electrodes thereof is a thin film produced from the vapors of a mixture consisting essentially of 80±2% $Dy_2O_3$, 10±2% $B_2O_3$, and 10±2% $SiO_2$, by weight, evaporated under vacuum at temperatures exceeding 1650° C.

13. A stable high-temperature capacitor produced by at least partly vaporizing a homogeneous mixture consisting essentially of dysprosium dioxide, boric oxide, and silicon dioxide in the relative proportions by weight of 80:10:10 ±2%, and depositing the vaporized material in the form of a uniform thin dielectric film on a metal electrode, followed by the deposition of another metal electrode on the surface of the dielectric film opposite that disposed against the first-mentioned electrode.

14. The invention according to claim 13 wherein said mixture is vaporized at temperatures exceeding 1650° C. under a vacuum maintained at approximately $10^{-5}$ mm. Hg.

15. The invention according to claim 14 wherein deposition of the vaporized material on said first-mentioned metal electrode is initiated only after the temperature of said mixture is within the range from 1700° C. to 1900° C.

16. The invention according to claim 15 wherein deposition of the vaporized material on said first-mentioned metal electrode is continued for a period of time sufficient to produce a dielectric film having a thickness in the range from 500 A. to 25 microns.

References Cited
UNITED STATES PATENTS

| | | | |
|---|---|---|---|
| 887,598 | 3/1906 | Delloye | 317—258 |
| 2,805,166 | 9/1957 | Loffler | 106—54 |
| 3,195,030 | 7/1965 | Herczog et al. | 317—258 |
| 3,256,499 | 6/1966 | Khouri et al. | 252—63.5 |

ALFRED L. LEAVITT, *Primary Examiner.*

A. M. GRIMALDI, *Assistant Examiner.*